United States Patent
Stadtfeld

(10) Patent No.: US 12,097,566 B2
(45) Date of Patent: Sep. 24, 2024

(54) METHOD OF MANUFACTURING A TOOTHED BEVEL HONING TOOL FOR HONING A TOOTHED BEVEL WORKPIECE, A TOOTHED BEVEL HONING TOOL AND METHOD OF HONING BEVEL GEARS

(71) Applicant: THE GLEASON WORKS, Rochester, NY (US)

(72) Inventor: Hermann J. Stadtfeld, Manderscheid (DE)

(73) Assignee: THE GLEASON WORKS, Rochester, NY (US)

( * ) Notice: Subject to any disclaimer, the term of this patent is extended or adjusted under 35 U.S.C. 154(b) by 285 days.

(21) Appl. No.: 17/754,965

(22) PCT Filed: Nov. 4, 2020

(86) PCT No.: PCT/US2020/058876
§ 371 (c)(1),
(2) Date: Apr. 18, 2022

(87) PCT Pub. No.: WO2021/092011
PCT Pub. Date: May 14, 2021

(65) Prior Publication Data
US 2022/0402055 A1     Dec. 22, 2022

Related U.S. Application Data

(60) Provisional application No. 62/930,722, filed on Nov. 5, 2019.

(51) Int. Cl.
B23F 19/05     (2006.01)
B23F 21/03     (2006.01)

(52) U.S. Cl.
CPC .............. *B23F 19/05* (2013.01); *B23F 21/03* (2013.01)

(58) Field of Classification Search
CPC ........... B23F 19/05; B23F 21/00; B23F 21/03
See application file for complete search history.

(56) References Cited

U.S. PATENT DOCUMENTS 3,909,990 A    10/1975   Tersch
4,799,337 A *   1/1989   Kotthaus ................. B23F 23/12
                                                                    409/29

(Continued)

FOREIGN PATENT DOCUMENTS

CH           340117 A     7/1959
DE         4313533 A1 *   10/1994          B23F 19/007
JP          59-7520 A     1/1984

OTHER PUBLICATIONS

DE-4313533-A1 translation (Year: 1994).*

(Continued)

*Primary Examiner* — Michael W Hotchkiss
(74) *Attorney, Agent, or Firm* — Robert L. McDowell

(57) ABSTRACT

A method for producing honing tools (24) that are conjugate to the bevel pinions and ring gears (26) they are intended to hone and which can be produced (e.g. cut) on a standard bevel gear free form machine. The method is described by two transformation steps with the basis of the transformations being the theoretical generating gear. The invention relates also to a toothed bevel honing tool produced by such a method and a method of honing bevel gears when provided with such a tool produced by such a method.

8 Claims, 16 Drawing Sheets

(56) References Cited

U.S. PATENT DOCUMENTS

| | | | | |
|---|---|---|---|---|
| 4,981,402 | A * | 1/1991 | Krenzer | B23F 23/006 |
| | | | | 700/169 |
| 5,044,127 | A * | 9/1991 | Ryan | B23F 19/055 |
| | | | | 451/275 |
| 5,079,877 | A * | 1/1992 | Abysov | B23F 21/00 |
| | | | | 51/293 |
| 5,092,720 | A * | 3/1992 | Abysov | B23F 19/007 |
| | | | | 407/29 |
| 5,255,475 | A * | 10/1993 | Kotthaus | B23F 17/001 |
| | | | | 451/548 |
| 6,712,566 | B2 * | 3/2004 | Stadtfeld | B23F 9/025 |
| | | | | 409/27 |
| 9,782,848 | B2 | 10/2017 | Stadtfeld et al. | |
| 2012/0099939 | A1 * | 4/2012 | Stadtfeld | B23F 15/06 |
| | | | | 409/38 |
| 2018/0221976 | A1 * | 8/2018 | Yoshinaga | B23F 5/163 |
| 2018/0264569 | A1 | 9/2018 | Stadtfeld et al. | |

OTHER PUBLICATIONS

Goldrich, Robert N., "CNC Generation of Sprial Bevel and Hypoid Gears: Theory and Practice", The Gleason Works, Rochester, NY, 1990, 9 pgs.

Shtipelman, Boris, "Design and Manufacture of Hypoid Gears", John Wiley & Sons Inc., 1978, pp. 7-13.

International Search Report and Written Opinion for PCT/US2020/058876, ISA/EPO, Feb. 18, 2021, 13 pgs.

\* cited by examiner

METHOD OF MANUFACTURING A TOOTHED BEVEL HONING TOOL FOR HONING A TOOTHED BEVEL WORKPIECE, A TOOTHED BEVEL HONING TOOL AND METHOD OF HONING BEVEL GEARS

FIELD OF THE INVENTION

The present invention is directed to honing of gears and in particular to the honing of bevel and hypoid gears and tools therefor.

BACKGROUND OF THE INVENTION

In the production of gears, especially bevel and hypoid gears, two types of processes are commonly employed, generating processes and non-generating processes.

Generating processes can be divided into two categories, face milling (intermittent indexing) and face hobbing (continuous indexing). In generating face milling processes, a rotating tool is fed into the workpiece to a predetermined depth. Once this depth is reached, the tool and workpiece are then rolled together in a predetermined relative rolling motion, known as the generating roll, as though the workpiece were rotating in mesh with a theoretical generating gear, the teeth of the theoretical generating gear being represented by the stock removing surfaces of the tool. The profile shape of the tooth is formed by relative motion of the tool and workpiece during the generating roll.

In generating face hobbing processes, the tool and workpiece rotate in a timed relationship and the tool is fed to depth thereby forming all tooth slots in a single plunge of the tool. After full depth is reached, the generating roll is commenced.

Non-generating processes, either intermittent indexing or continuous indexing, are those in which the profile shape of a tooth on a workpiece is produced directly from the profile shape on the tool. The tool is fed into the workpiece and the profile shape on the tool is imparted to the workpiece. While no generating roll is employed, the concept of a theoretical generating gear in the form of a theoretical "crown gear" is applicable in non-generating processes. The crown gear is that theoretical gear whose tooth surfaces are complementary with the tooth surfaces of the workpiece in non-generating processes. Therefore, the cutting blades on the tool represent the teeth of the theoretical crown gear when forming the tooth surfaces on the non-generated workpiece.

In the manufacture of bevel and hypoid gears with curved flank lines, the cutting tools utilized are primarily face mill or face hob cutters, such types of cutting tools are well known in the art of gear manufacture. In face mill cutters the cutting blades are arranged in the cutter head in a circular manner such that in the face milling process, one tooth slot is formed with each plunge of the cutter and the cutter must be withdrawn and the workpiece indexed to the next tooth slot position in order to form the next tooth slot. Tooth slots, and gear teeth, formed by face milling have a lengthwise curvature in the form of a circular arc.

Face hobbing comprises cutting blades arranged about a cutter, not in line with each other, but in groups, usually pairs comprising an inner cutting blade and an outer cutting blade. Unlike most face milling processes, in which all cutting blades pass through the tooth slot during its formation, face hobbing comprises each successive group of cutting blades passing through respective successive tooth slots with each blade in the group forming a cut completely along the longitudinal portion of the tooth slot. The cutter and the workpiece rotate in a timed relationship with each other thereby allowing continual indexing of the workpiece and continual formation of each tooth slot of the gear. Thus, in face hobbing (i.e. continuous indexing), a single plunge of the cutting tool results in all tooth slots of the workpiece being formed. Tooth slots, and gear teeth, formed by face hobbing have a lengthwise curvature in the form of an epicycloid.

The relationship between the workpiece and theoretical generating gear can be defined by a group of parameters known in the art as basic machine settings. These basic settings communicate a sense of size and proportion regarding the generating gear and the work piece and provide a common starting point for gear design thus unifying design procedures among many models of machines. The basic settings totally describe the relative positioning between the tool and workpiece at any instant.

Basic machine settings for forming gears are known in the art and one such disclosure of them can be found in Goldrich, "CNC Generation of Spiral Bevel and Hypoid Gears: Theory and Practice" The Gleason Works, Rochester, N.Y., 1990. In this publication, basic machine settings are identified as follows:
- the radial, S, which is the distance between the cradle axis and the tool axis;
- the tilt angle, Pi, which defines the angle between the cradle axis and tool axis;
- the swivel angle, Pj, which defines the orientation of the tool axis relative to a fixed reference on the cradle;
- the cradle angle, q, which defines the angular position of the tool about the cradle axis;
- the root angle, $\Sigma$, which sets forth the orientation of the work support relative to the cradle axis;
- the sliding base, Xb, which is the distance from the machine center to the apparent intersection of the work and cradle axis;
- the head setting, Xp, which is a distance along the work axis from the apparent intersection of the work and cradle axis to a point located a fixed distance from the workpiece;
- work offset, Em, which defines the distance between the work axis the cradle axis;
- rotational position of the workpiece, $W_G$; and
- rotational position of the tool, $W_T$, which is used in the case of face hobbing.

In addition, in generating processes, it is necessary to know the ratio-of-roll, Ra, which is the ratio of the rotation of the work piece to the rotation of the cradle.

FIG. 1 illustrates a theoretical basic gear machine comprising a machine base 2, a tool head 4 linearly movable on ways 6 attached to machine base 2. The basic machine also includes a work head 8 linearly movable on ways 10 attached to work table 12 which is movable in an arcuate path on way 14 about pivot axis $W_P$.

Mounted on tool head 4 is a cradle 16 which is rotatable about cradle axis $W_C$ and attached to cradle 16 is a series of adjustable drums 18, 20, and 22 which control the eccentric, swivel, and tilt angles respectively. These drums are set to position the tool 24, rotatable about tool axis $W_T$, in an appropriate manner with respect to the work gear 26.

Work head 8 includes slide 28 which in turn carries work gear 26 rotatable about work axis WG. Slide 28 is positioned and set to the desired hypoid offset distance.

The axes of the theoretical machine all have a gear theoretical meaning. The theoretical gear machine preferably comprises eight axes although more or less could be present and are within the scope of the present invention.

Movement of tool head 4 on ways 6 defines the sliding base setting, Xb, to control the depth of cut. Positioning of slide 28 controls the vertical motion or hypoid offset, Em. Movement of work head 8 along ways 10 controls head setting or pitch cone setting, Xp. Motion of the work table 12 about axis WP sets the root angle, $\Sigma$. Rotational adjustment of drum 18 (eccentric angle) adjusts the spiral angle of the work gear. Rotational adjustment of drums 20 and 22 sets the position of the cutter axis, swivel (angle Pj) and tilt (angle Pi) respectively, to adjust the flank profile and influence lengthwise crowing and mesh crowning. Rotation of the cradle 16 provides rotation of the generating gear (angle $\gamma$) about axis $W_C$. Axes $W_T$ and $W_G$ provide for rotation of the tool and work gear respectively. If a gear is to be produced by a generating method, then a ratio-of-roll, Ra, which is the ratio of work gear rotation to cradle rotation, is also needed.

In conventional mechanical gear forming machines, the cradle angle, work rotation, and tool rotation change during generation while the other settings generally remain fixed. Two notable exceptions to this are helical motion which involves motion of the sliding base, Xb, and vertical motion which is motion in the work offset direction, Em.

Conventional mechanical machines for producing bevel and hypoid gears comprise a work support mechanism and a cradle mechanism which, during generating processes, carries a circular tool along a circular path about an axis known as the cradle axis. The cradle represents the body of the theoretical generating gear and the cradle axis corresponds to the axis of the theoretical generating gear. The tool represents one or more teeth on the generating gear.

The conventional mechanical machine meets the concept of the theoretical basic machine since nearly all machine settings correspond to theoretical basic settings. Such a machine is shown and described in the previously mentioned Goldrich publication. In the mechanical machine, the basic setting for the radial, S, is controlled by an angular machine setting known as the eccentric angle which is commonly denoted by "$\beta$".

Gear producing machines have been developed which reduce the number of machine settings necessary to orient a tool relative to a work piece. These machines transform the settings and movements of the conventional mechanical machine to a system of linear, rotational, and pivoting axes which results in a more universal yet simplified machine. For example, see U.S. Pat. Nos. 4,981,402 and 6,712,566, both disclosures in their entirety being hereby incorporated by reference.

Hard finishing of bevel and hypoid gears manufactured according to the continuous indexing face hobbing process has been limited in the past to lapping and skiving. In lapping, a mixture of oil and certain abrasive particles, for example silicon carbide or aluminum oxide particles, is poured into the mesh between a pinion and a gear which are rotating in mesh. During the lapping, a light torque is applied, first in one direction of rotation and then in the opposite rotational direction. In order to achieve a finishing material removal on an area of the flank surfaces which is larger than the regular tooth contact under light load, oscillations of the three axes of the lapping machine which resemble a Cartesian coordinate system are applied during the rotational contact of the drive side (first rotational direction) and the coast side (second rotational direction). The result of a lapping process as hard finishing operation is a surface smoothing after the heat treatment and also a reduction of the consolidated heat treat distortions which commonly results in a low compound error in a single flank test and a tooth contact check.

The individual flank form of lapped pinions and gears is not consistent with the theoretically calculated, face hobbed flank surfaces. This makes it difficult to judge the final physical properties of a lapped gearset. It is also impossible to include the lapping process in a closed loop manufacturing setup because the corrections to the cycle parameters of the lapping machine have to be applied by using intuition and experience, rather than deviation results from a coordinate measuring machine.

Skiving after heat treatment is usually used for low quantities of larger size bevel gearsets. Skiving uses a face cutter head and blades very similar to the soft cutting operation and removes a certain stock allowance after the case carburizing and quenching of bevel and hypoid gears. Skiving delivers a defined surface form on each tooth of each member similar to grinding (which is not possible for face hobbed bevel gears). The tool life of the skiving blades is low compared to the tool life in soft cutting, which makes skiving unattractive and too expensive for larger production badges.

Grinding of face hobbed bevel gearsets is not possible if the theoretical tooth form should be preserved. Grinding with a cup-shaped grinding wheel forms a circular flank lead function, where the correct lead function of face hobbed bevel gears is an epicycloid.

For many years, the face hobbed bevel gear manufacturing industry has desired a defined hard finishing operation similar to grinding for face milled bevel gears in order to establish a precise and modern hard finishing production which enables the utilization of coordinate measurement results in an closed loop online manufacturing system.

Honing processes which use bevel pinion and/or bevel ring gear shaped tools with an abrasive surface are known in the bevel gear manufacturing industry as shown by, for example, U.S. Pat. Nos. 3,909,990; 4,799,337; 5,044,127 and 5,079,877. The obstacles of those past developments come from limitations of the available machine technology but more so from the inability to define the proper conjugate honing tool for pinion and ring gear members.

The honing process described in DE 43 13 533 A1 introduces a generating motion in addition to the timed relationship between the rotation of honing tool and work piece. With the generating motion, the honing tool travels inside of a virtual, internal generating gear in order to envelop the generating gear and achieve a gentle increase in chip load from start roll to center roll position. From center roll position to the end roll position the chip load would then fade back to zero. The process of a complex generating motion in connection with the continuous rolling and a double flank chip removal contact is very difficult to control. There are no teachings in DE 43 13 533 A1 of how to determine the required tool geometry which is conjugate to the gear or pinion to be honed and how to achieve manufacturability of those tools.

The honing tool geometry in many of the past attempts to develop a honing process for face hobbed bevel gears had been defined either by trial and error or by a "back forming process". In the back forming process, the honing tool for a ring gear (i.e. in the form resembling a pinion) is created by CBN (Cubic Boron Nitride) coating of the teeth of a finish developed (but soft) ring gear. This coated ring gear is then used to hone the yet uncoated real ring gear honing tool from a regular pinion which was cut with stock allowance. The honed pinion is then CBN coated to form honing tool for a ring gear. One method of coating a tool with the CBN abrasive comprises plating a layer of nickel and CBN onto the areas of the tool where the abrasive coating should be attached. The CBN particles may have a grit size of for example 0.050 mm. An additional layer of nickel (e.g. 50% of the thickness of the CBN layer) may be applied to imbed the abrasive and attach it securely to the tool.

This above method has the advantage that by the back forming process, the ring gear tool would receive a flank form which was perfectly conjugate to the ring gear to be honed. The disadvantages, next to the time consuming process of back forming is the fact that in most cases only part of the flank surfaces fulfilled the Gearing Law and presented the required conjugate profile and lead. Areas like the transition to the root fillet showed mutilations and interferences which in many cases caused the undercut to extend into the active flank surfaces which eliminated large areas of the flank surface from participating in a correct transmission of the rotation. Furthermore, honing tools created by the back forming method have the tendency to often lose their coating in the areas of interference and incorrect flank surface during honing of one single ring gear or pinion.

The honing process is usually a wet machining process like grinding but with considerably lower relative surface speed. The relative surface speed between honing tool and work gear is about 5 to about 10 meters/second (m/s), where in grinding relative surface speeds between about 18 and about 30 m/s are common. In the honing process, the relative velocity is generated by the relative sliding velocity between tool and work. The required level of sliding velocities requires a certain hypoid offset between tool and work piece in connection with the maximal possible RPM of the honing machine spindles. It is possible that the original gearset has only a small hypoid offset which would not generate a sufficient relative sliding. The state of the art does not teach how to overcome this problem. Such a gearset could simply not be honed.

The state of the art technology of the chip removal in the honing process is based on double-flank honing as can be seen in FIG. 2 which shows the principle of the state of the art double flank honing. A honing tool which has teeth like a bevel gear (or pinion) but in addition has CBN-coated, abrasive flank surfaces is fed into mesh with the pinion (or gear) to be honed while both work piece and tool are in synchronized rotation. At the point when the first double flank contact occurs (shown as "Begin of Material Removal") the abrasive coating layer of the honing tool begins to remove the remaining stock that has been left for the hard finishing operation. From this point the plunge feed motion occurs with a slow and precise feed rate until the "End of Material Removal" position is reached. This slow feed rate is critical to this process due to the lack of compliance between the contacting members. Feed rates above the critical value will cause a stripping of the CBN coating off the honing tool and therewith destroy the expensive tool. The problem is the fact that the critical plunge feed rate is unknown.

The critical plunge feed rate depends on the effective sliding velocity between work piece and tool flank surfaces, on the distortion of the work gear due to the heat treatment and on the typical differences between the two flank surfaces which form a slot of a spiral bevel or hypoid pinion (or gear). The differences between the two flanks can create normal forces to the coating layer which may vary by a factor 10 during each tool tooth mesh and it can also vary by a factor 10 during each revolution of the work gear, caused by the heat treatment distortion. In the rotational positions, where the "high spots" come together, the normal forces can be, for example, 100 times higher than in the low spots. Because the normal forces create, together with the sliding velocity, the shear forces tangential to the surfaces, the abrasive CBN grains on the tool surface are broken out of the coating bond and a stripping of the coating is initiated.

With the state of the art double flank honing of FIG. 2, the CBN coated honing tool teeth contact both flanks of the work gear slots simultaneously which creates a system without noticeable process compliance. The result is a condition which causes premature failure of the CBN coated tool. If the plunge feed rate is higher than the possible chip removal rate, the CBN coating will likely be stripped off the tool surface. Single-flank honing was never given significant consideration because the electronic coupling of the high speed spindles showed dynamic problems which caused a "hammering" of the tool teeth onto the work piece gear teeth which often destroyed the tool coating during the approach of the tool from the index position to the first tooth flank contact.

SUMMARY OF THE INVENTION

The invention is directed to a method for producing honing tools that are conjugate to the bevel pinions and ring gears they are intended to hone and which can be produced (e.g. cut) on a standard bevel gear free form machine. The method is preferably described by two transformation steps with the basis of the transformations being the theoretical generating gear.

The inventive method of manufacturing a toothed bevel honing tool for honing a toothed bevel workpiece comprises defining cutting machine setup parameters for producing the toothed bevel workpiece with a cutter wherein said cutter comprises a plurality of cutting blades with each cutting blade having a cutting blade profile, wherein the setup parameters comprise defining a first generating gear setup comprising a generating gear setup and cutter geometry for the toothed bevel workpiece.

A first transformation is carried out whereby the first generating gear setup is transformed to a second generating gear setup comprising a generating gear setup and cutter geometry for producing cutting teeth on a generating gear for the toothed bevel honing tool. A second transformation is carried out whereby the second generating gear setup is transformed to a third generating gear setup comprising a generating gear setup and cutter geometry for producing teeth on the toothed bevel honing tool whereby the toothed bevel honing tool will be conjugate to the toothed bevel workpiece.

A bevel honing tool blank is machined to produce a toothed bevel honing tool blank wherein the machining is in accordance with the third generating gear setup and cutter geometry for producing teeth on the toothed bevel honing tool. An abrasive coating is applied to the teeth of the toothed bevel honing tool blank to produce a toothed bevel honing tool.

DETAILED DESCRIPTION OF THE PREFERRED EMBODIMENT

Figure 1:
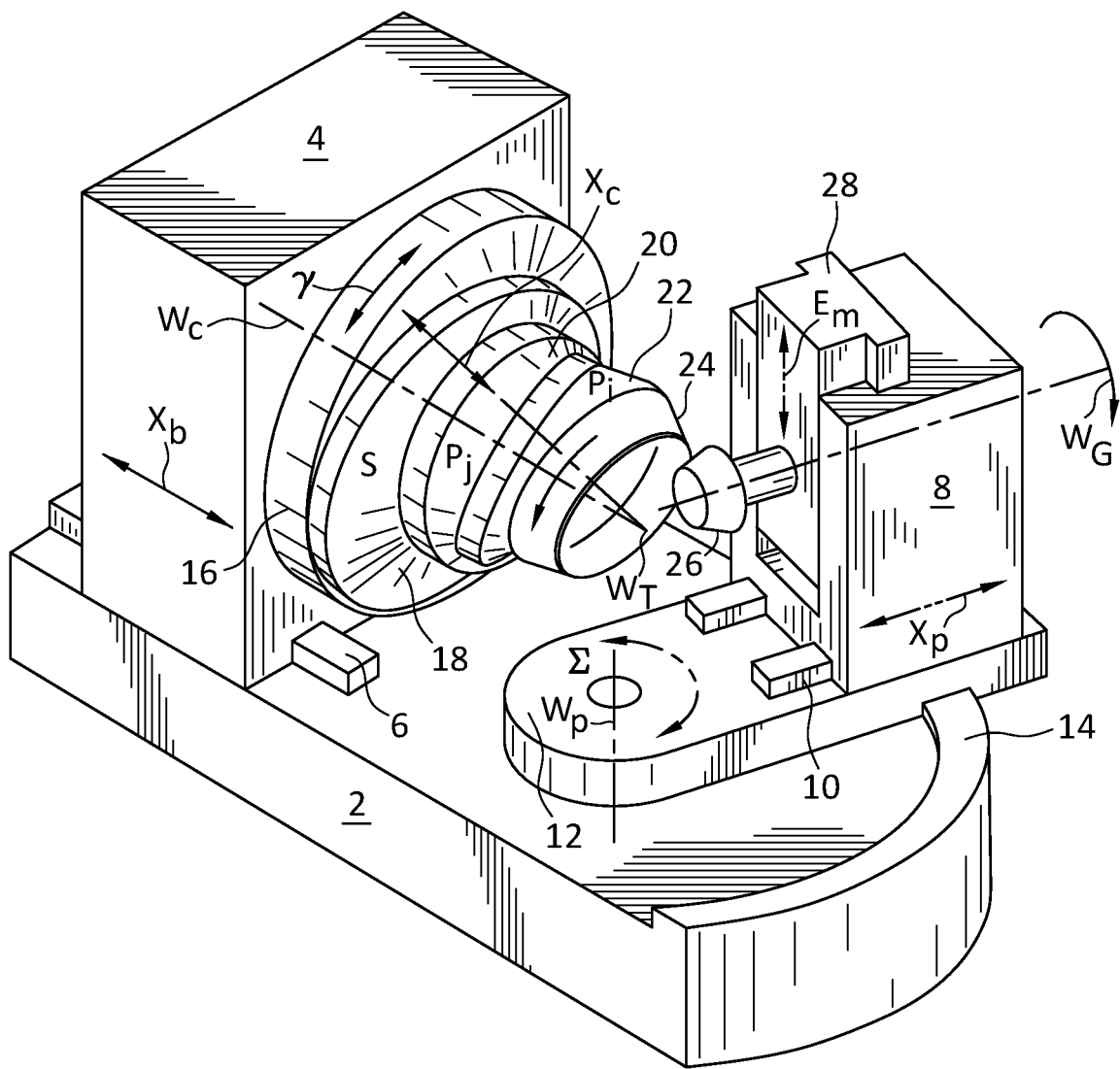
FIG. 1 shows a theoretical bevel and hypoid gear generating machine.
Figure 2:
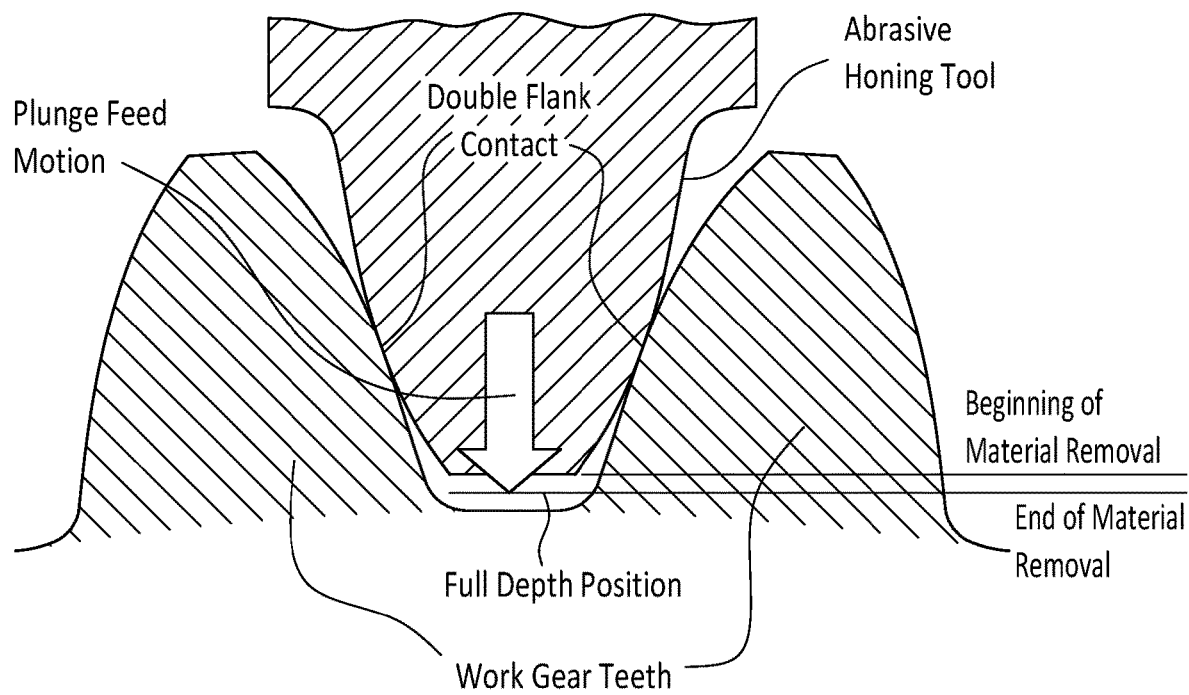
FIG. 2 illustrates double flank plunge honing of the prior art.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The use of "including", "having" and "comprising" and variations thereof herein is meant to encompass the items listed thereafter and equivalents thereof as well as additional items. The use of letters to identify elements of a method or process is simply for identification and is not meant to indicate that the elements should be performed in a particular order. In addition, terms such as "first", "second", "third", etc., are used to herein for purposes of description and are not intended to indicate or imply importance or significance. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/".

The details of the invention will now be discussed with reference to the accompanying drawings which illustrate the invention by way of example only. In the drawings, similar features or components will be referred to by like reference numbers.

In the context of the invention, the term "bevel" gears is understood to be of sufficient scope to include those types of gears known as bevel gears including bevel pinions and bevel ring gears, "hypoid" gears, as well as those gears known as "crown" or "face" gears.

The inventive method to create honing tools that are conjugate to the bevel pinions and ring gears they are supposed to hone and which can be produced (e.g. cut) on a standard bevel gear free form machine (e.g. U.S. Pat. No. 6,712,566) is preferably explained by two transformation steps. The basis of the transformations is the theoretical generating gear setup.

First, the transformation for the pinion honing tool (in the form of a bevel ring gear) will be discussed and then for a generated or non-generated ring gear honing tool (in the form of a bevel pinion).

Figure 3:
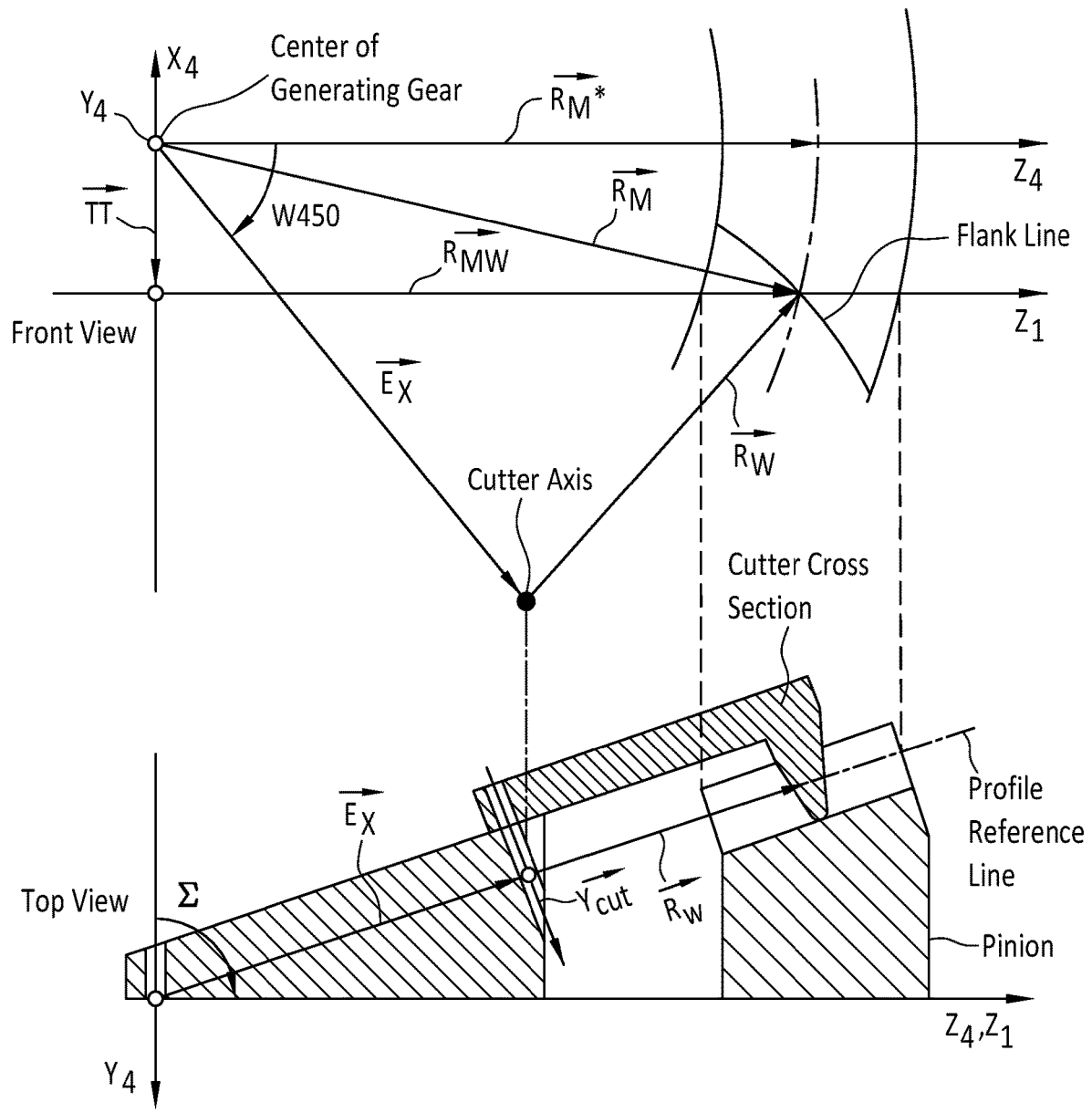
FIG. 3 shows basic settings for pinion cutting.

A typical pinion generating gear setup is shown in FIG. 3. The inventive cutting machine setup required for the manufacture of a conjugate mate for the pinion to be honed comprises two transformation steps.

FIG. 3 shows a coordinate system X4-Y4-Z4 in a two-dimensional front view and a two-dimensional top view. The main coordinate system X4-Y4-Z4 represents the generating gear axis (Y4 axis) and the generating plane (X4-Z4 plane). The upper portion of FIG. 3 represents the front view of the generating plane. The vector $R_M{}^*$ defines the mean radius of the generating gear (equal in magnitude to the vector $R_M$ which starts at the center of the generating gear and points to the midface point of the pinion). Preferably, bevel gearsets to be honed are hypoid gear sets which means they have a hypoid offset. The hypoid offset is indicated in FIG. 3 as vector TT. In the present example the hypoid offset TT moved the pinion rotational axis Z1 along the X4 axis below the Y4-Z4 plane. The pinon bound mean cone radius vector $R_{MW}$ can be calculated with $R_{MW} = R_M - TT$ The cutter center position in the X4-Y4-Z4 coordinate system is defined with $E_X$. The angle between the $E_X$ vector and the Z4 axis represents the center roll angle, W450, in FIG. 3. The additional vector $R_W$ is the cutter radius vector. $E_X + R_W = R_M$ represents the so called "Triangular Vector Diagram" which contains all information (except the machine root angle and the ratio of roll) for the machine setup required to cut the original pinion which should be honed after heat treatment.

The top view onto the generating gear setup at the lower portion of FIG. 3 shows the vector Ex which positions the center of the cutter head in the location required to cut the correct flank line and tooth depth. In the top view portion of FIG. 3 the cutter axis vector $Y_{CUT}$ is also shown. $Y_{CUT}$ orients the cutter in three dimensional space. Also the cross sections of the cutter and the pinion are shown in the top view. The additional machine setting "machine root angle $\Sigma$" is the orientation of the work gear axis Z1 versus the negative side of the generating gear axis Y4. An angle $\Sigma$ of 180° presents per definition the case of a parallel system. The kinematic machine setup parameter "Ratio of Roll" is calculated by the number of generating gear teeth divided by the number of work gear teeth.

Figure 4:
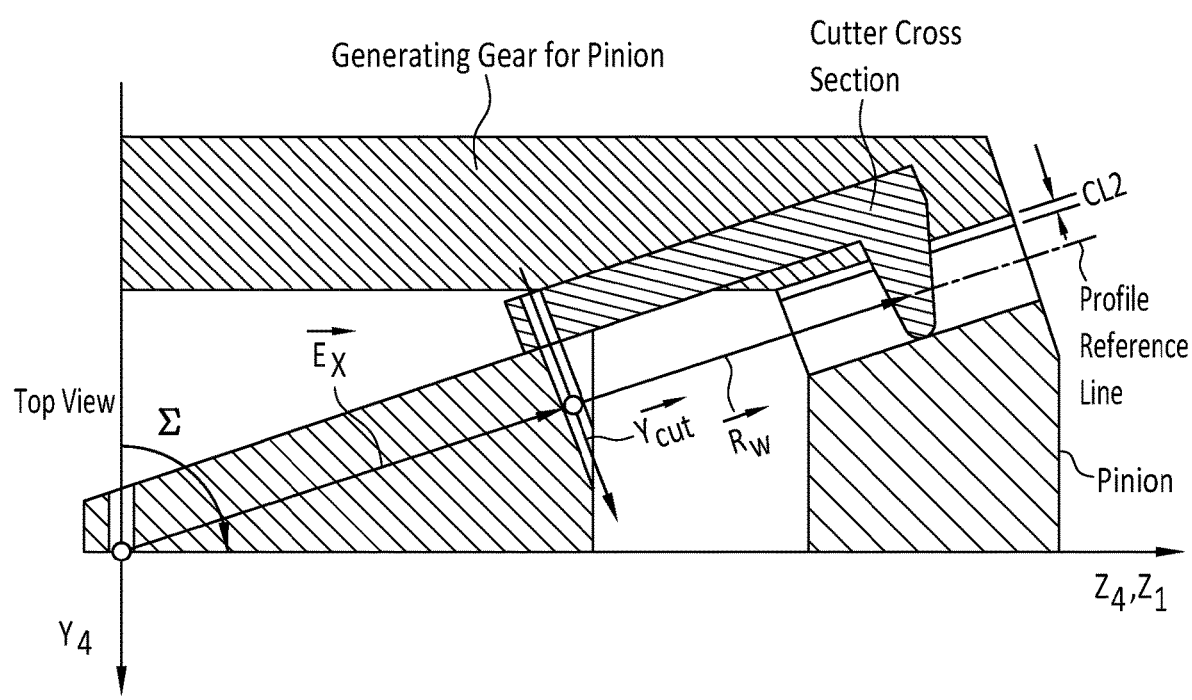
FIG. 4 shows a generating gear for a pinion.
Figure 5:
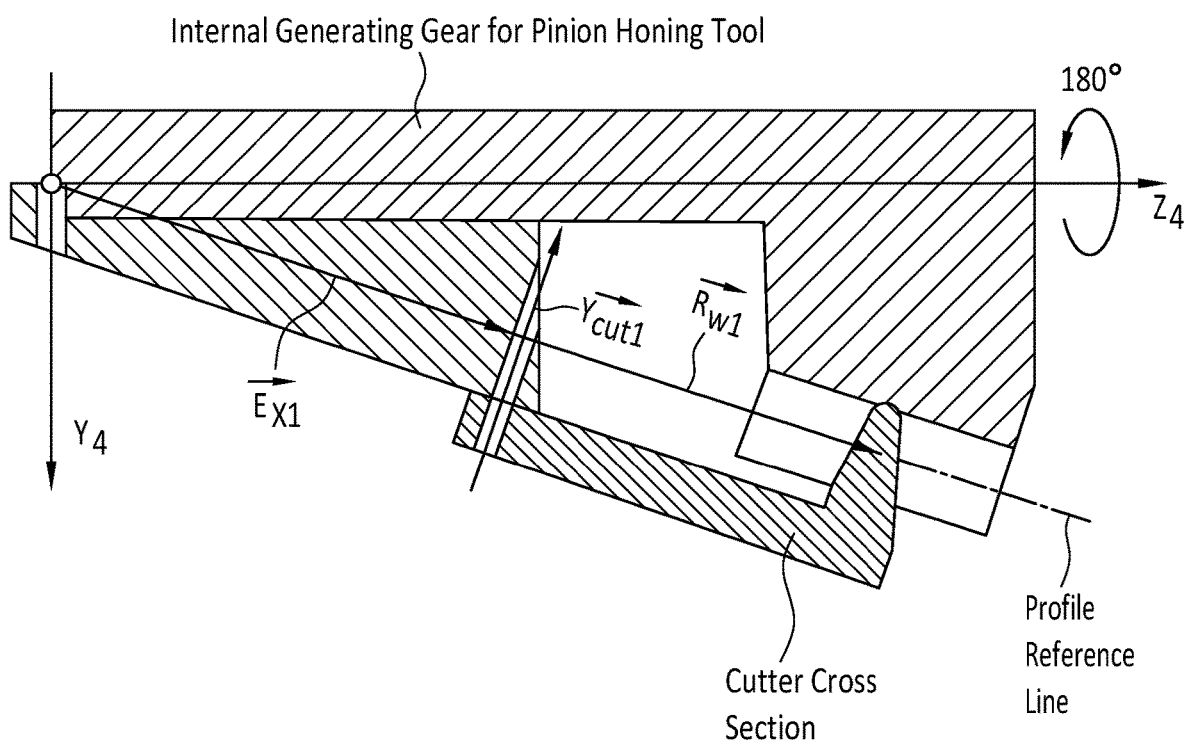
FIG. 5 illustrates an internal generating gear for pinion honing tool.

The initial state is shown in FIG. 4 which shows the top view image of FIG. 3 but with the addition of the pinion generating gear which is represented by the machine setup and the cutter geometry. Also the clearance between the tooth tip of the pinion and the root of the generating gear CL2 is considered in FIG. 4. The first transformation is a rotation of the vectors TT, $E_X$, $R_W$ and $Y_{CUT}$ around the $Z_4$ axis by 180°. The result of this transformation shown in FIG. 5 is a setup which will cut an internal ring gear ($E_{X1}$, $R_{W1}$, $Y_{CUT1}$). This internal ring gear is the generating gear for the pinion honing tool. The cutter in this view is oriented to cut the teeth of the internal generating gear. Because the internal pinion honing tool generating gear is only of a virtual nature and the goal is not to machine the generating gear of the pinion honing tool, but for the cutter to represent one tooth of the pinion honing tool generating gear with the cutter geometry, positioning and kinematic (rotation around the axis $Y_4$), a second transformation is required.

Figure 6:
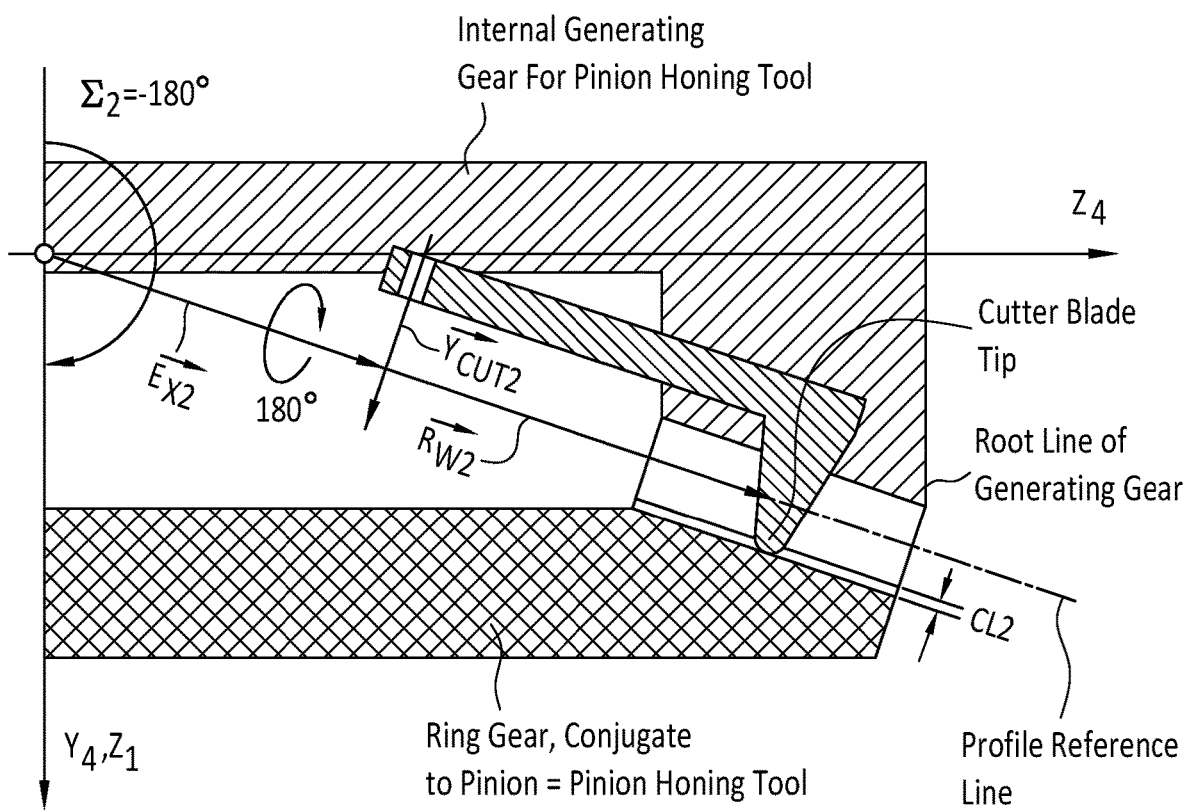
FIG. 6 shows a mirror image of a generating gear.

In the second transformation, the cutter axis vector $Y_{CUT1}$ is rotated by 180° around the reference profile line. The result of this transformation is shown in FIG. 6 with the vectors $E_{X2}$, $R_{W2}$, $Y_{CUT2}$. In FIG. 6 the cutter axis vector $Y_{CUT2}$ points away from the internal generating gear root line and the cutter blade tip represents the top of the tooth of the internal generating gear (plus the clearance value CL2). The cutter setup in FIG. 6 represents the internal generating gear which can precisely cut the ring gear, shown as the pinion honing tool, which will be conjugate to the pinion to be honed.

Most of the basic settings required to cut the pinion honing tool are contained in the vectors $E_{X2}$ and $Y_{CUT2}$. Additionally only the number of teeth of the pinion honing tool is required which is equal to the number of teeth of the original non-generated ring gear. In the process of honing the pinion, a honing machine root angle $\Sigma$ between honing tool and pinion (see FIG. 7) equal to the root angle $\Sigma$ for the pinion cutting is used in the honing process (see FIG. 3).

Figure 7:
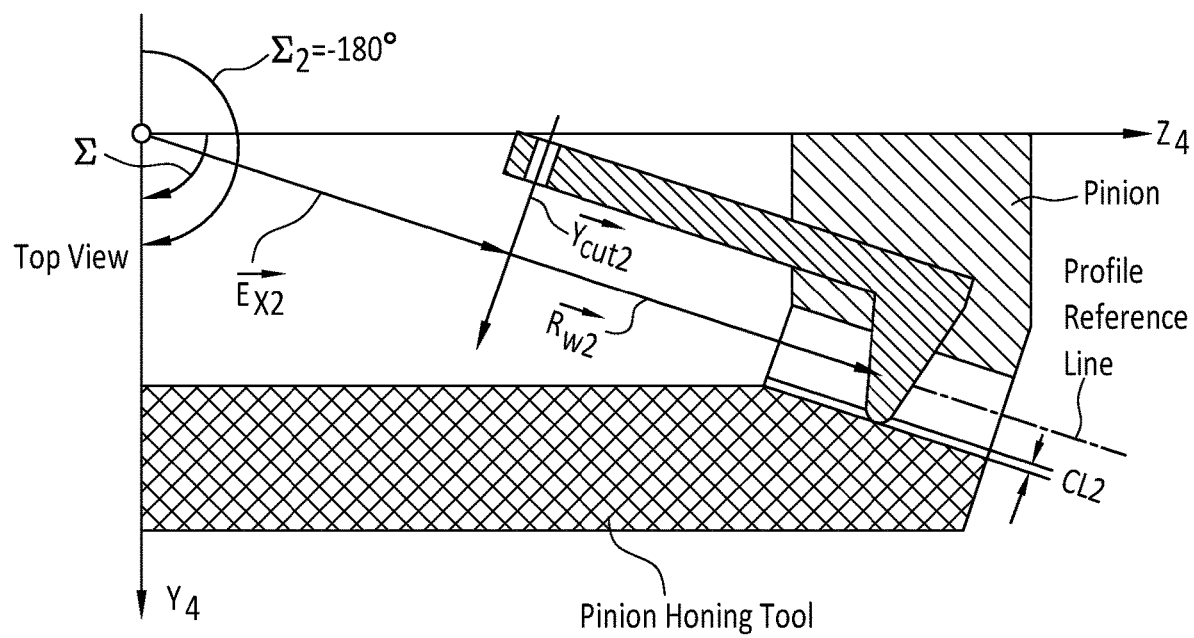
FIG. 7 illustrates a pinion tool and a pinion to be honed.

For the pinion honing tool it is not possible to change the number of teeth without violating the Gearing Law and as consequence lose the conjugacy between tool and work. Pinions designed for a non-generated ring gear can only mesh conjugate with other non-generated ring gears which have the same blank dimensions and basic data (most importantly the same number of teeth) as the original non-generated ring gear. The arrangement between pinion honing tool and pinion is shown for clarity of the explanations in FIG. 7 where the pinion honing tool is in mesh engagement with the pinion to be honed. The cutter arrangement from FIG. 6 is also shown in FIG. 7 as a reference.

Figure 8A:
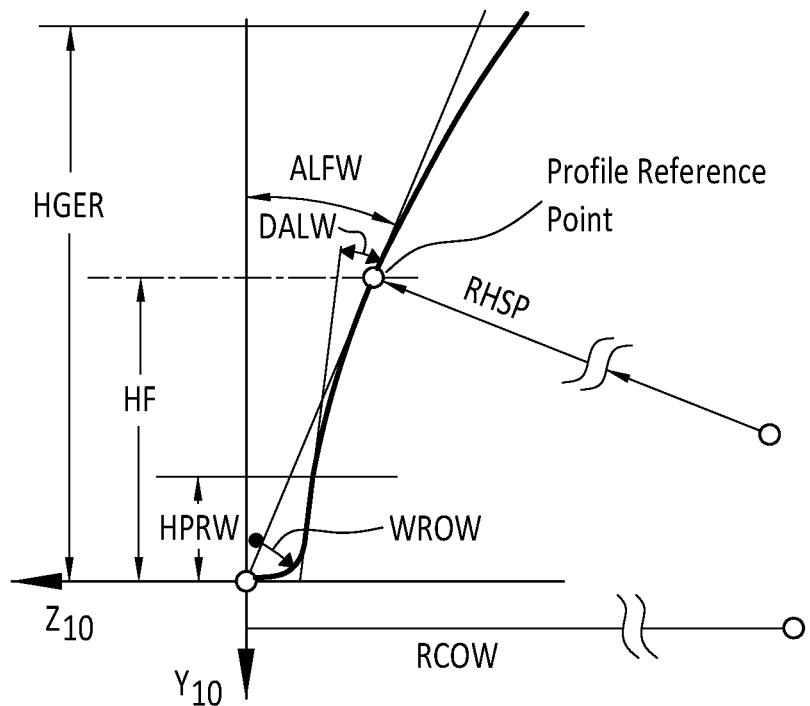
FIG. 8(a) illustrates an initial blade profile.
Figure 8B:
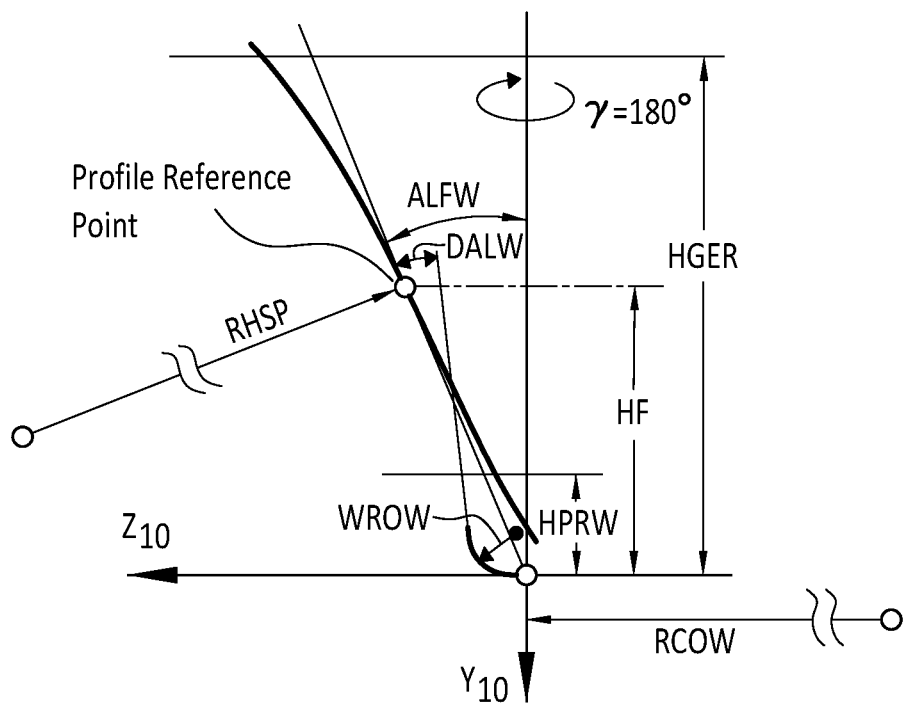
FIG. 8(b) shows a blade profile rotation around axis Y10.

In order to cut the correct pinion honing tool flank forms regarding pressure angles, profile curvature and protuberance into the honing tool blank, the cutting blade profiles from the original pinion cutter have to undergo three transformations, i.e. have to be mirrored three times with three different mirror axes. FIG. 8(a) shows a representation of all significant blade profile elements on the example of an inside blade:

$Y_{10}$-$Z_{10}$ . . . Blade profile coordinate system
HGER . . . Profile height
HF . . . Height of the blade reference point
HPRW . . . Protuberance depth
ALFW . . . Blade pressure angle
DALW . . . Protuberance angle
RHSP . . . Blade curvature
WROW . . . Blade edge radius
HKOW . . . Flank modification depth
DKOW . . . Flank modification angle
SRAD . . . Blade shoulder radius
HGEW . . . Blade grind depth Each mirroring is equivalent to a 180° rotation about a specific axis. The first 180° rotation $\gamma$ around the Y10 axis results in the graphic in FIG. 8(b). The inside blade in FIG. 8(a) has become an outside blade in FIG. 8(b). The pressure angle ALFW and the point radius RCOW remain as they were for the inside blade in FIG. 8(a).

Figure 8C:
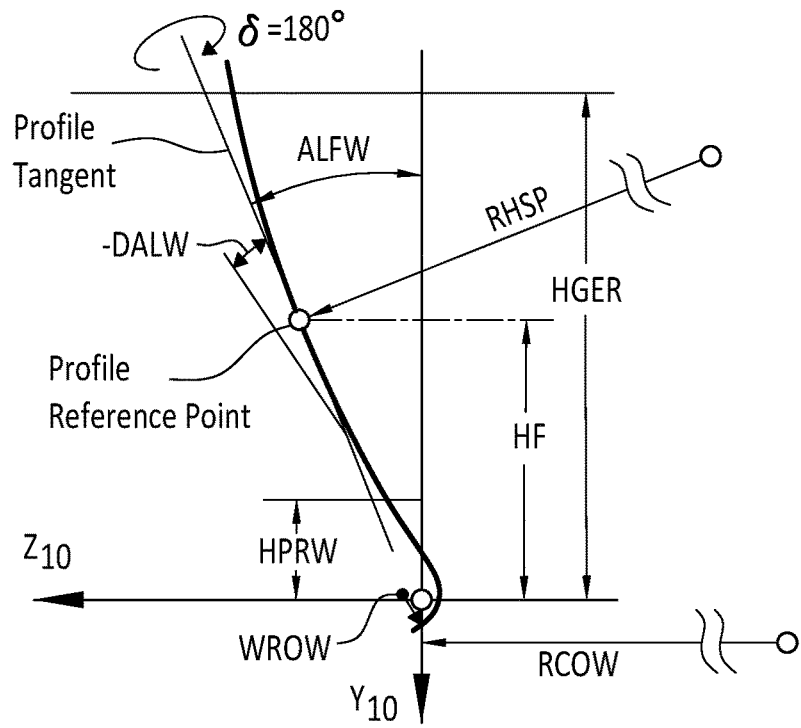
FIG. 8(c) shows a blade profile rotation around a profile tangent.

The second 180° rotation $\delta$ around the profile tangent makes the concave profile curvature in the example convex and the protuberance negative (−DALW). Also the edge radius WROW rotates with the other profile elements. The result of the second rotation is shown in FIG. 8(c).

Figure 8D:
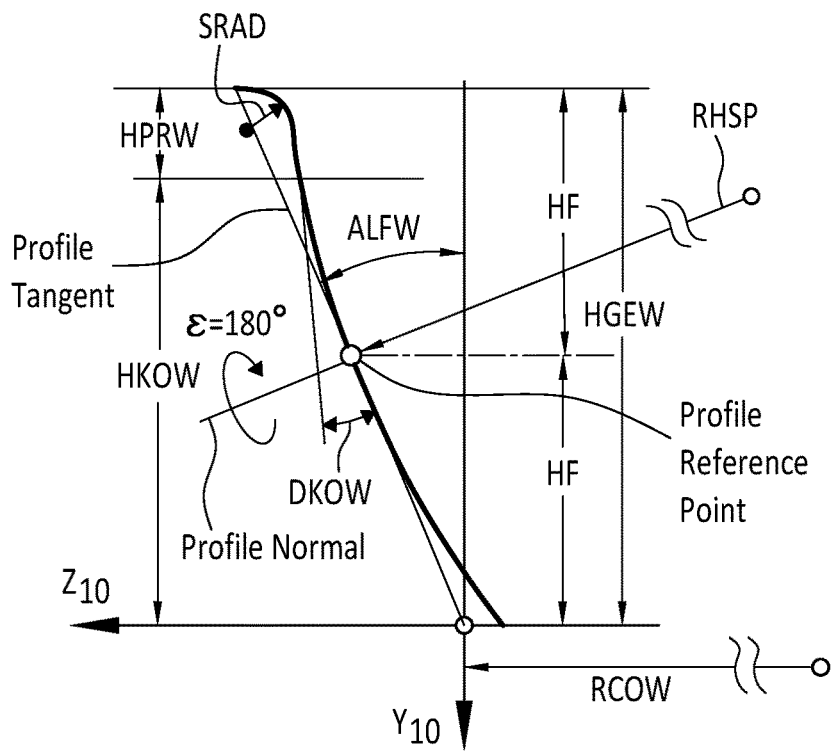
FIG. 8(d) shows a blade profile rotation around a profile normal.

The result of the third 180° rotations $\varepsilon$ around the profile normal at the profile reference point is shown in FIG. 8(d). The protuberance angle (−DALW) in FIG. 8(c) becomes a flank modification angle (DKOW). The blade portions below and above the profile reference point are now equal to HF. The flank modification begins at HKOW from the blade tip (measured along the $Y_{10}$ axis) which is equal to HPRW from the blade grind depth. The edge radius WROW in FIG. 8(c) becomes a blade shoulder radius SRAD in FIG. 8(d). Due to a consequent execution of the rotations, the profile depth after the third rotation must become equal to twice the blade reference height HF. This is also the explanation why the required clearance values CL1 and CL2 are automatically achieved after the described rotations. The transformation of the outside blade profile follows the identical procedure.

After the transformation of the machine settings as well as the cutting blade profile definitions, the blank dimensions of the pinion honing tool can be calculated from the pitch angle and the mean cone radius (known by vector $R_{MW}$) as well as from the addendum HF and the dedendum (which is for a honing tool also equal HF). The outer and inner cone distances of the pinion honing tool teeth are determined by positioning the pinion honing tool axis together with the pinion to be honed in the same coordinate system, and applying the principle of closest proximity of the two bodies in space. This technique is described by Boris shitpleman in "Design and Manufacture of Hypoid Gears", John Wiley & Sons, Inc. 1978, pages 7 to 13. The results are the coordinates of the toe and heel boundaries of the honing tool blank. At this point all the required information for the pinion honing tool blank definition is given. It is good practice to extend the face width at the toe and at the heel for example by 5 mm (for a work gearset with module of 3 to 6 mm).

In the process of honing the pinion, which may be conducted on a multi-axis free form CNC machine of the type as disclosed in U.S. Pat. No. 6,712,566 for example, the honing machine root angle between honing tool and pinion ($\Sigma$ in FIG. 7) is equal to the root angle $\Sigma$ which is used to generate the pinion (see FIG. 4). The honing ratio between tool and work spindle is calculated by $RA_{HON} = z_{WORK} / z_{TOOL}$, where:

$z_{WORK}$ . . . Number of work gear teeth
$z_{TOOL}$ . . . Number of honing tool teeth The calculation of machine settings and tool definitions for generated ring gear honing tools is identical to the calculation steps explained for the pinion honing tool.

Additionally, many automotive and truck bevel gear sets have non-generated ring gears thereby making the inventive honing tool and process very attractive for non-generated gears.

Figure 9:
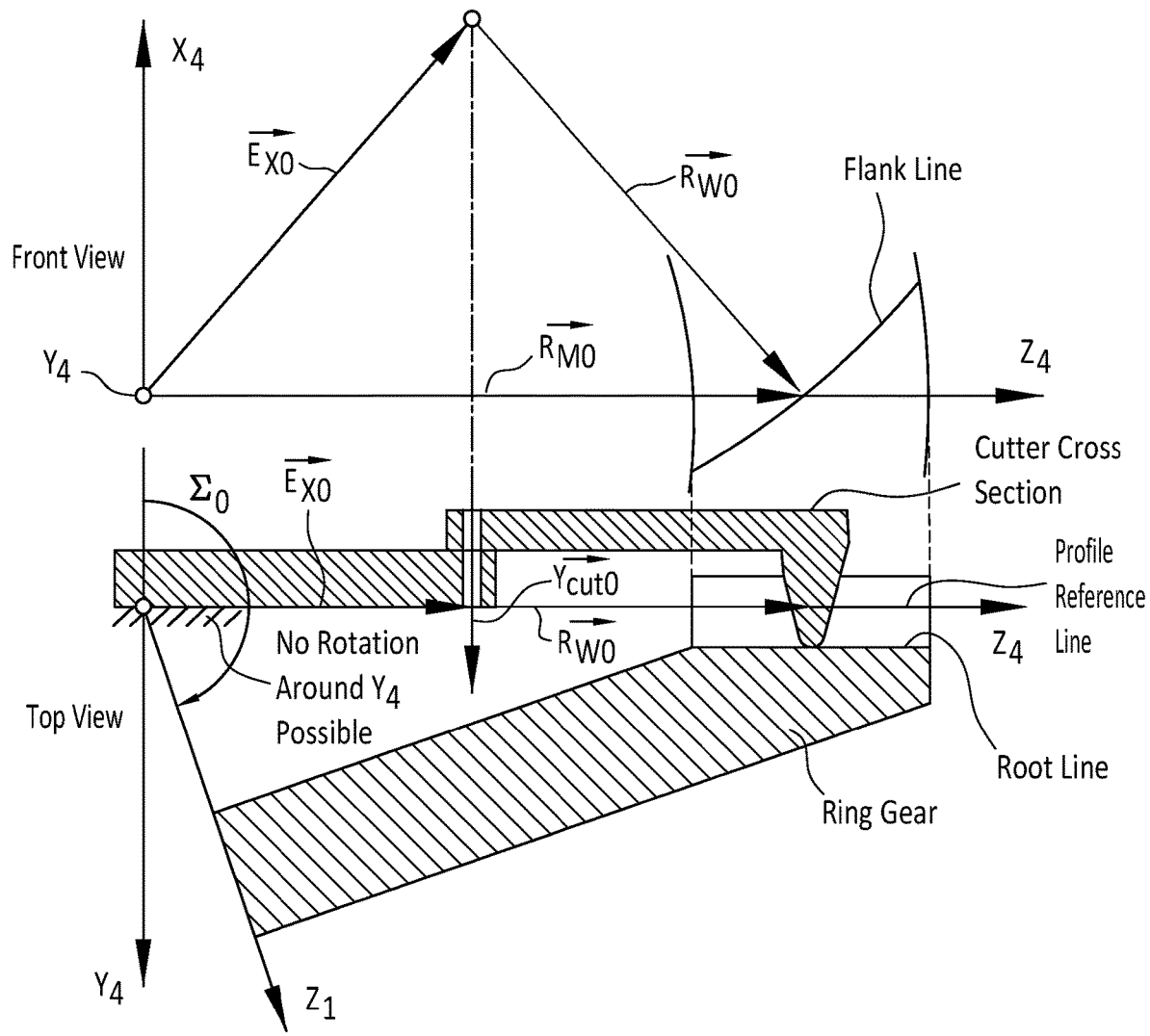
FIG. 9 illustrates simplified machine settings for non-generated gear cutting.

Non-generated ring gears do not require a general set of basic settings which represent a generating gear but only need simplified machine settings in order to position a cutter head to cut the correct spiral angle and tooth depth. Simplified non-generated machine settings are also called V-H settings because of the simple vertical and horizontal positioning of the cutter head. The example in FIG. 9 shows the V-H configuration to cut a non-generated ring gear. The ring gear root line is adjusted with the machine root angle $\Sigma_0$ parallel to the coordinate axis $Z_4$. All three vectors, $E_{X0}$, $R_{W0}$ and $R_{M0}$ lie in the plane, defined by the coordinate axes $X_4$ and $Z_4$. The cutter axis vector $Y_{CUT0}$ lies in the horizontal plane $Y_4$-$Z_4$. $E_{X0}$ has a vertical component in $X_4$ direction (V) and a horizontal component (H) in $Z_4$ direction (front view in FIG. 9), but no component in $Y_4$ direction (top view in FIG. 9).

Figure 10:
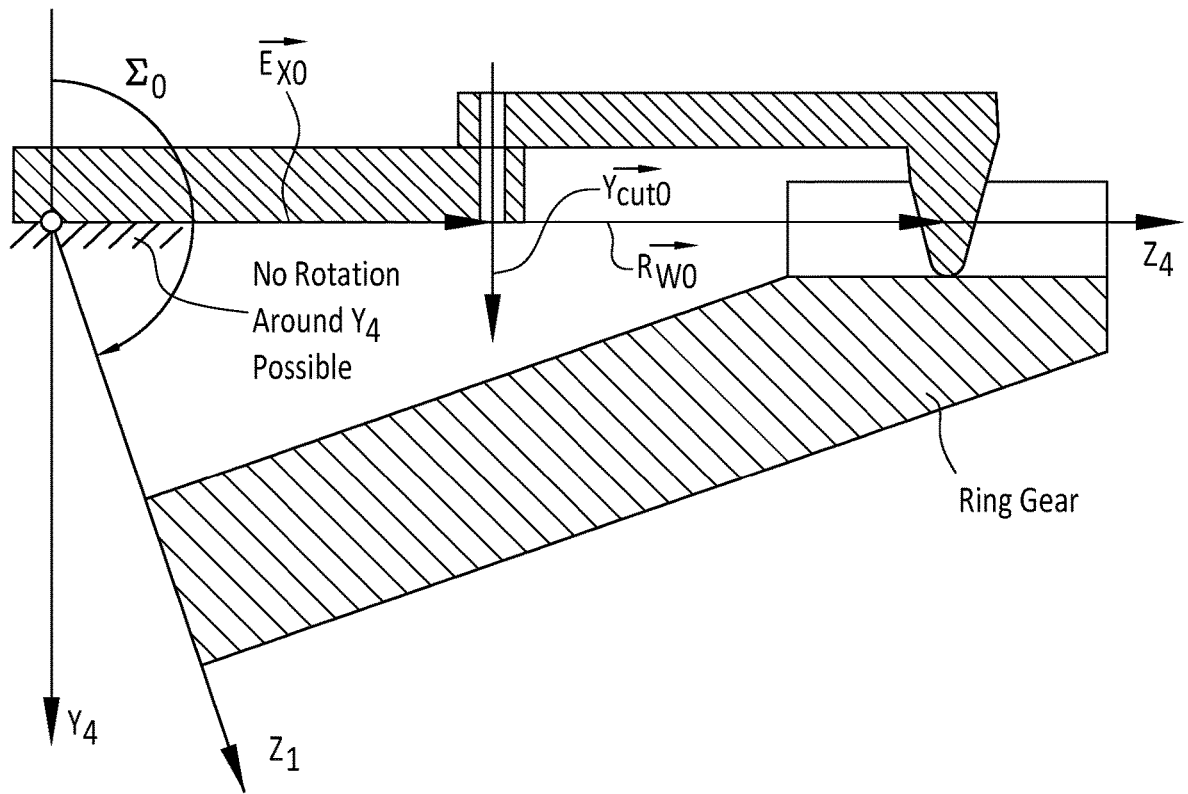
FIG. 10 is a top view of simplified non-generated machine settings.

In order to create a honing tool which is conjugate to the ring gear to be honed, the simplified non-generated ring gear settings have to be converted to generating basic settings. This conversion uses as a starting point the configuration in FIG. 10. FIG. 10 shows the top view image of FIG. 9 which includes the ring gear and the cutter positioning in the V-H configuration. FIG. 10 provides the basis for the explanations given with the FIGS. 11 through 13.

Figure 11:
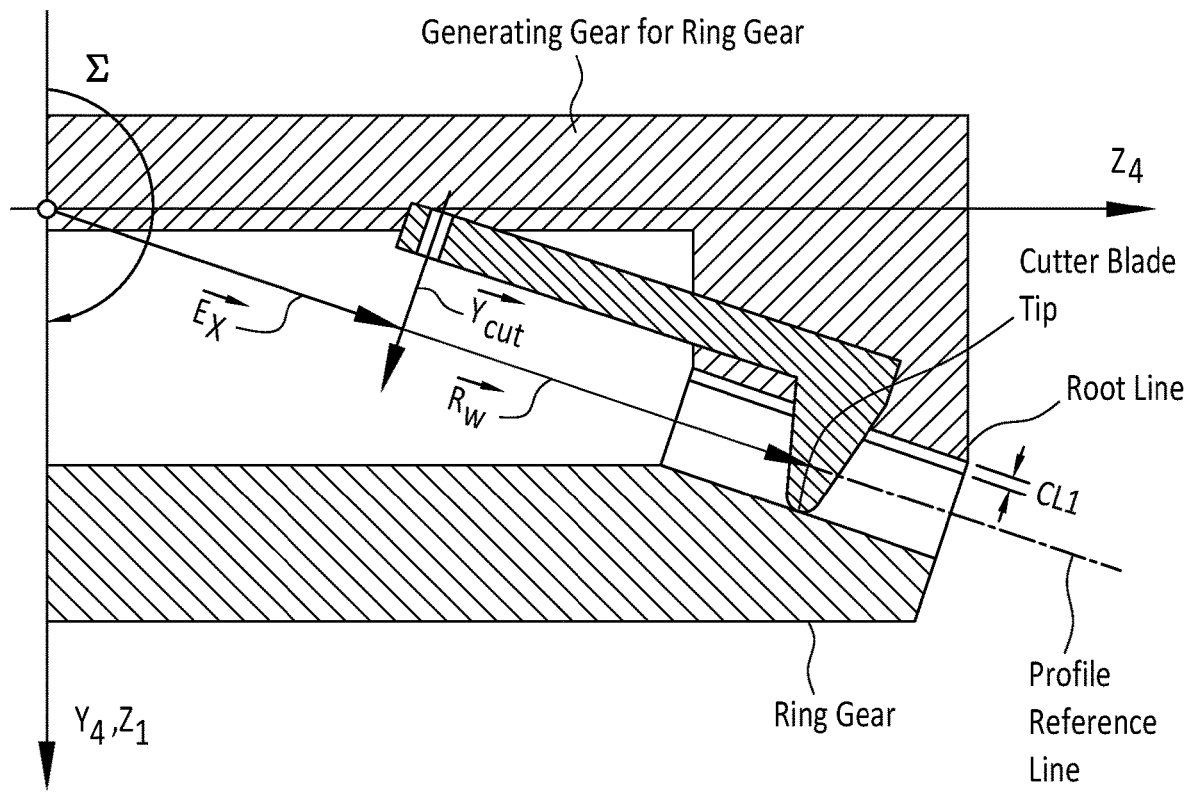
FIG. 11 illustrates a generating gear for a ring gear.

The conversion of V-H settings into general basic settings for a generating process has been described in U.S. Pat. No. 9,782,848, the entire disclosure of which is hereby incorporated by reference. V-H settings may be converted into general basic settings as shown in FIGS. 10 and 11 which will cut an identical non-generated ring gear. The generating settings for a non-generated ring gear represent the internal mirror image of the ring gear itself. The ratio of roll of the setup in FIG. 11 is equal to 1. This means there is no relative motion between generating gear and work gear and the setup in FIG. 11 is merely a more general way to define the cutting machine setup.

Figure 12:
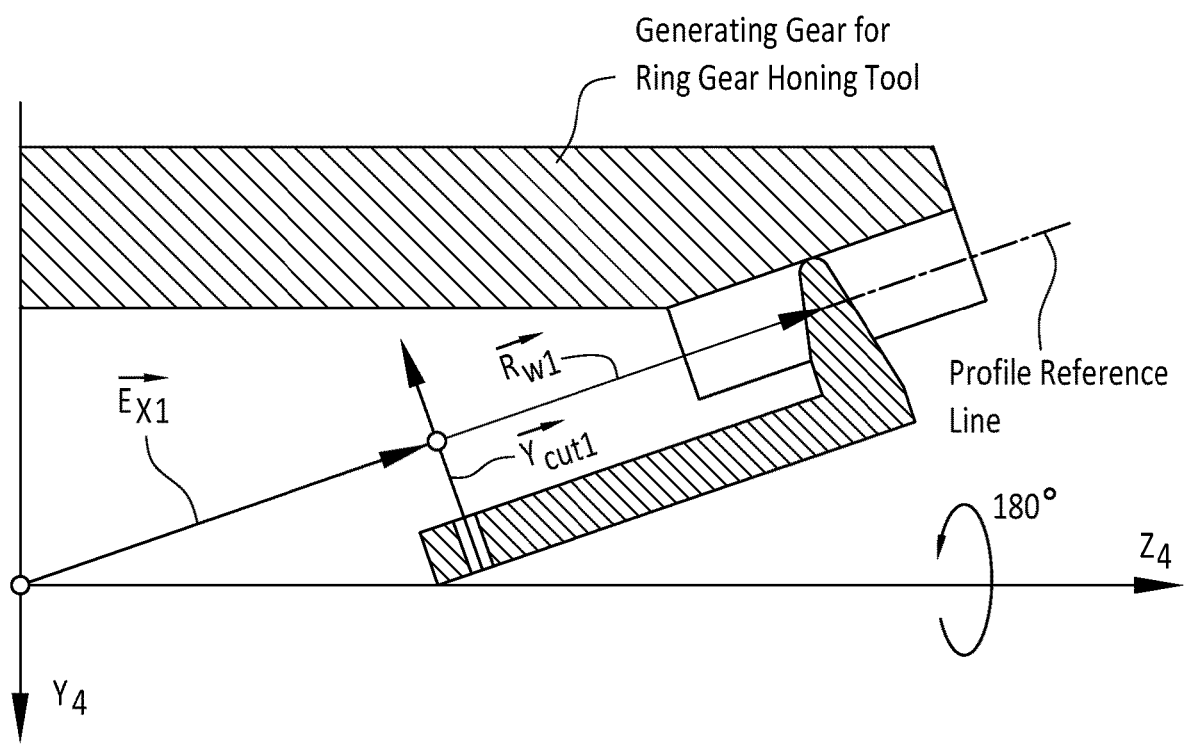
FIG. 12 shows a generating gear for ring gear honing tool.
Figure 13:
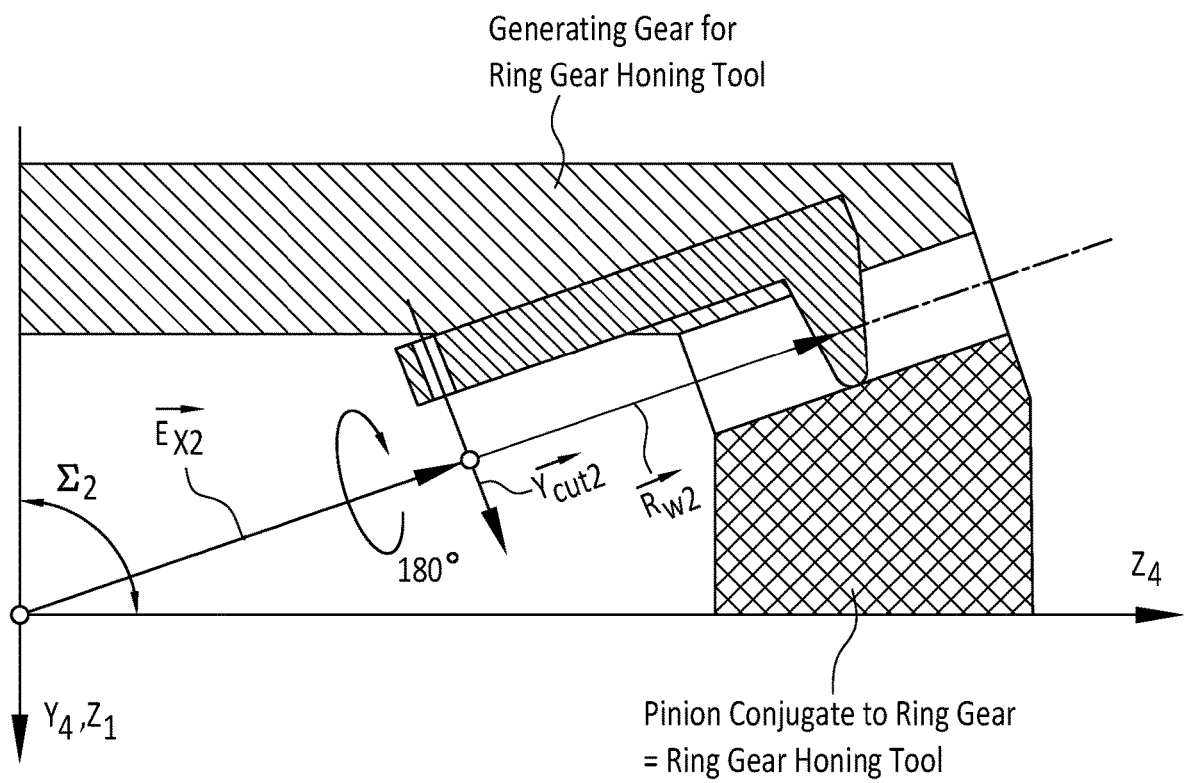
FIG. 13 illustrates basic settings for ring gear honing tool cutting.

The first transformation is a rotation of the vectors $E_{X0}$, $R_{W0}$ and $Y_{CUT0}$ around the $Z_4$ axis by 180°. The result of this transformation shown in FIG. 12 is a setup which will cut the generating gear for the ring gear honing tool ($E_{X1}$, $R_{W1}$, $Y_{CUT1}$). The cutter in this view is oriented to cut the teeth of the generating gear. Because the inventive task is not to machine the generating gear of the ring gear honing tool, but for the cutter to represent one tooth of the ring gear generating gear, the second transformation is required. In the second transformation, the cutter axis vector $Y_{CUT1}$ is rotated by 180° around the reference profile line resulting in $Y_{CUT2}$. The result of this transformation is shown in FIG. 13 with the vectors $E_{X2}$, $R_{W2}$, $Y_{CUT2}$. The vectors $E_{X2}$, $R_{W2}$ have not changed versus $E_{X1}$, and $R_{W1}$.

Figure 14:
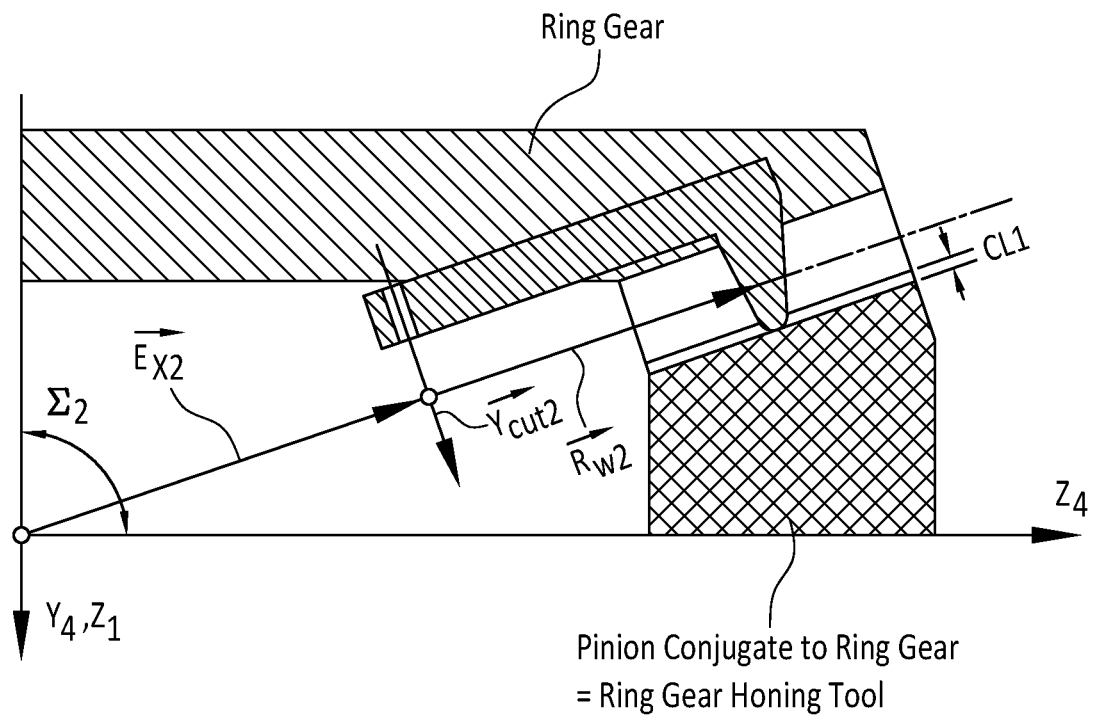
FIG. 14 shows a ring gear honing tool engaged with ring gear to be honed.

In FIG. 13, the cutter axis vector $Y_{CUT}2$ points away from the generating gear and the cutter blade tip represents the top of the tooth of the generating gear (plus the clearance value CL1). The cutter setup in FIG. 13 represents the generating gear which can precisely cut the pinion, also referenced as the ring gear honing tool, which will be exactly conjugate to the ring gear to be honed. The combination of the ring gear to be honed in mesh with the ring gear honing tool is shown in FIG. 14. The generating gear setup including the symbolized cutter with the cutting blade (from FIG. 13) is shown as a reference in FIG. 14.

Most of the basic settings required to cut the ring gear honing tool are contained in the vectors $E_{X2}$ and $Y_{CUT2}$. Additionally required settings are the machine root angle $\Sigma_2$ (which is equal to the ring gear honing tool cutting machine root angle $\Sigma_2$) and the number of teeth of the ring gear honing tool. As a starting point, the number of teeth of the original pinion is used as the number teeth of the ring gear honing tool.

For the ring gear honing tool it is possible to change the number of teeth without consequences to the conjugacy of the tool. In case of insufficient sliding velocities, it is also possible to choose an offset for the combination honing tool—work piece which is larger than the offset of the original gearset. Changing the number of ring gear honing tool teeth and the tool offset requires an adjustment of the pitch angle (and subsequently root angle and face angle) of the tool blank. The pitch angle change is calculated such that the circumference at mean face can accommodate the transverse pitch of the changed tooth count. In case of a tool tooth count change, the machine root angle $\Sigma_2$ for cutting the honing tool has to be adjusted by $\Delta\Sigma$ accordingly. Each non-generated ring gear can mesh with a plurality of pinions with varying number of teeth, pitch angle and even different hypoid offsets which demonstrates that those variables can be changed on the ring gear honing tool without losing the conjugate relationship between tool and the targeted work piece geometry.

In the process of honing the ring rear, the honing machine root angle between honing tool and ring gear (see FIG. 14) is equal to the root angle $\Sigma_2$ which is used to generate the ring gear honing tool (see FIG. 13). The honing ratio between tool and work spindle is calculated by $RA_{HON}=z_{WORK}/z_{TOOL}$, where:

$RA_{HON}$ ... Ratio between the ring gear and its honing tool
$z_{WORK}$ ... Number of work gear teeth
$z_{TOOL}$ ... Number of honing tool teeth In order to cut the correct flank forms regarding pressure angles, profile curvatures and protuberance into the honing tool blank, also the ring gear honing tool cutting blades are derived from the original ring gear cutting blade geometry by the three mirror rotations explained in connection with the pinion honing tool blades (FIGS. 8(a) through 8(d)).

One factor which has not been considered in the state of the art developments of bevel gear honing tools is the fact that the technological angles which make the cutting blades capable of removing chips when cutting the pre-hardened steel of a honing tool have an adverse effect to the conjugacy of the created tooth surfaces. For example, a side rake angle of 4.5° and a top rake angle of 3° will twist the flank surfaces of a bevel gear with a module of 4 mm and a face width of 35 mm by about 10 microns at the four corners. In most common cases it is not possible to remove such a surface twist with flank form corrections. This means, due to the fact that the required technological blade angles where used, the conjugacy of the honing tool was no longer given. The attempt to use honing tools with 10 microns or more corner deviation resulted in all cases in pinion and ring gear honing results which showed severe deficiencies regarding tooth contact as well as operating noise. This is the second reason the previously mentioned back forming process was used for the state of the art honing trials.

The solution to this problem may be addressed by an effective blade angle calculation of the two- and three-face blade grinding summary application, as is commercially available in the Gleason Hypoid Gear Design software, which allows choosing the effective cutting edge hook angle as an input item and which is also discussed in US 2018/0264569, the entire disclosure of which is hereby incorporated by reference. The two- and three-face blade grinding summary application according to US 2018/0264569 determines the top-rake angle required to achieve, with a given side rake angle, the effective cutting edge hook angle indicated as an input item. If an effective cutting edge hook angle of zero degree is as an input item, then any customary side rake angle (for example 4.5°) can be realized on a face hobbing cutting blade. If the blades for cutting of the finish geometry of pinion and gear honing tool are prepared with a zero degree cutting edge hook angle, then the required conjugate flank geometry of the honing tool can be achieved.

The honing tool teeth, including their toplands are CBN coated. The honing tool tooth thickness is reduced by the thickness of the CBN coating layer (commonly 80 microns per flank), such that after coating the correct honing tool tooth thickness is obtained. If the CBN coated honing tool teeth contact both flanks of the work gear slots simultaneously then a system without noticeable process compliance is created. The result is a condition which may cause premature failure of the CBN coated tool.

The preferred embodiment for the application of the inventive honing tool geometry is a chip removal by side honing. Current machine spindle synchronizations allow a compliant tuning in order to achieve a smooth chip removal. If the tool teeth are manufactured with reduced tooth thickness, then in a first step, plunging to full depth (without chip removal) is possible. During the plunging, work and tool are rotating with the desired honing speed and are synchronized such that the tool teeth will not contact the work gear teeth (or will do so very gently) during the plunge motion and when the position of full depth is reached. This is possible if the circular tooth thickness of the honing tool teeth is reduced by the amount of the stock allowance per slot side of the work gear plus an additional amount for clearance of for example 0.2 mm (in addition to the tooth thickness reduction required by the CBN coating layer).

Figure 15:
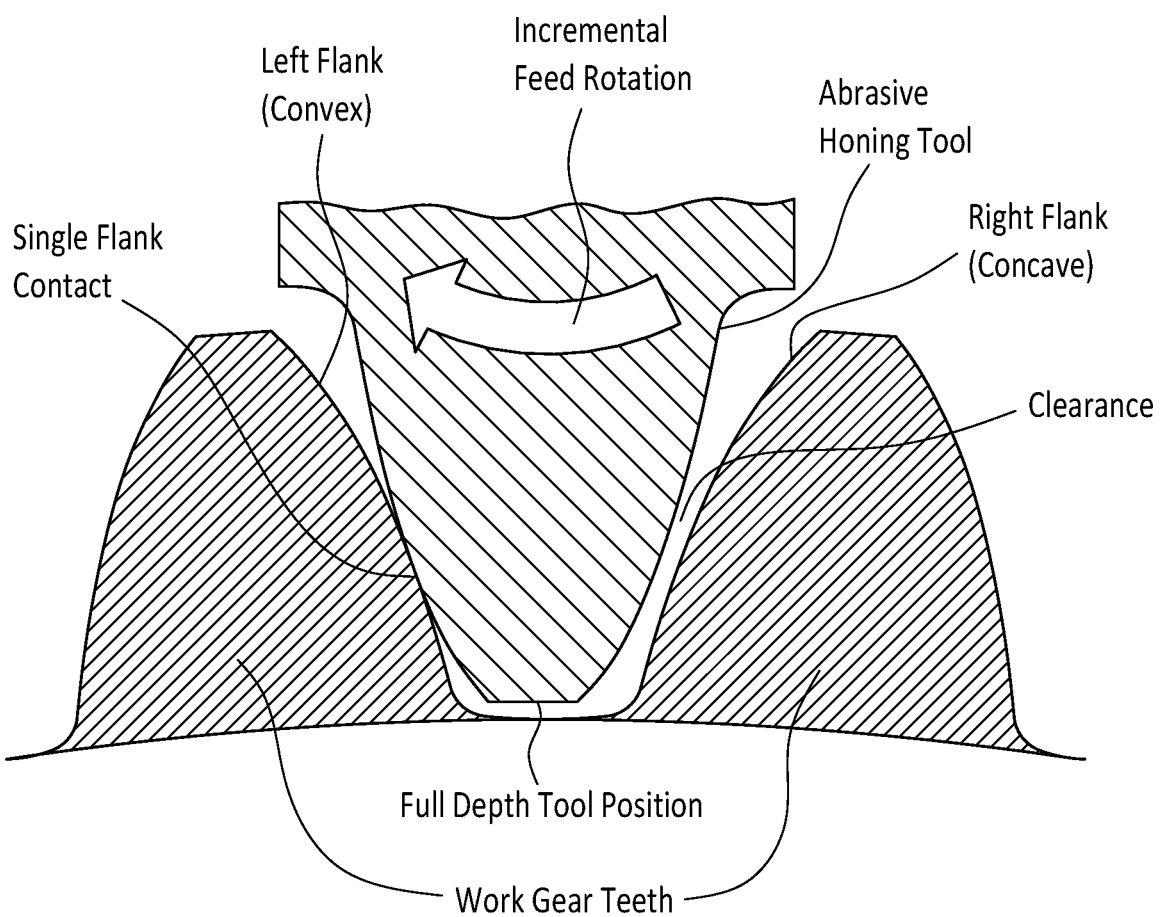
FIG. 15 illustrates the principle of side honing.

In a second step an incremental feed rotation as shown in FIG. 15 is applied in order to hone for example the left flanks of the work gear first. After finishing the left flank honing, the incremental feed rotation reverses and the tool teeth now contact and hone the right flanks of the work gear. The incremental feed motion is a rotation which is superimposed to the rotation of the tool. This incremental rotation is small in order to only remove the amount of stock allowance, for example 0.1 mm normal to the surface. After the stock on the left flank is removed, the incremental feed rotation reverses and rotates the tool teeth against the right flank. This reversed incremental rotation bridges the clearance and then rotates an additional amount in order to remove the stock from the right flanks of the work gear.

The freedoms to realize flank form corrections are limited in honing with a non-dressable tool surface coating to machine setting changes. Machine setting changes move the honing tool and the work gear in a different relative position to each other. Such a different relative position can be described with an axial honing tool move, an axial work gear move, an offset change as well as a change of the shaft angle the axis of tool and work include. Machine setting changes can accommodate first order flank form corrections (pressure angle and spiral angle) as well as tooth thickness corrections. The limitation in case of the state of the art plunge honing is that the desired corrections can only be realized on one tooth side (e.g. the convex flanks). The opposite side (e.g. the concave flanks) would therefore in all realistic cases receive an increase of their existing flank form deviations. The state of the art plunge honing process can not realize independent convex and concave flank form corrections with an existing honing tool. It would be necessary to manufacture a new honing tool which has said corrections superimposed to their conjugate surfaces. The additional advantage of side honing is the possibility to use different setting changes during honing the convex flanks and the concave flanks of the work gear which allows individual corrections of convex and concave flank honing. Individual corrections make the honing process a more flexible and economical hard finishing operation.

As an example, for honing an 11 tooth bevel pinion (original design) as defined by the following basic settings and a 45 tooth bevel ring gear (original design) as defined by the following V-H settings, the appropriate honing tools must be manufactured and the appropriate machine settings for the honing process must be determined.

Basic Settings—Original Design—Pinion (11 Teeth)

| | |
|---|---|
| RADIAL DISTANCE | 136.226 mm |
| TILT ANGLE | 25.493 deg |
| SWIVEL ANGLE | 315.818 deg |
| WORK OFFSET | 38.003 mm |

-continued

| | |
|---|---|
| MACHINE ROOT ANGLE | −.677 deg |
| MACHINE CENTER TO CROSSING PT | −.208 mm |
| SLIDING BASE | 31.004 mm |
| RATIO OF ROLL | 4.090917 |
| CENTER ROLL POSITION | 56.584 deg |

V-H Settings—Original Design—Ring Gear (45 Teeth)

| | |
|---|---|
| VERTICAL | 87.194 mm |
| HORIZONTAL | 113.750 mm |
| MACHINE CENTER TO CROSS PT | 13.626 mm |
| MACHINE ROOT ANGLE | 65.567 deg |

The above original design pinion and ring gear settings are utilized according to the above discussion to determine the appropriate basic and V-H settings to define the honing tools for machining gears as defined by the above "original" gears.

Basic Settings—Ring Gear Honing Tool (14 Teeth)

| | |
|---|---|
| RADIAL DISTANCE | 135.381 mm |
| TILT ANGLE | 24.433 deg |
| SWIVEL ANGLE | 310.095 deg |
| WORK OFFSET | 38.100 mm |
| MACHINE ROOT ANGLE | 4.246 deg |
| MACHINE CENTER TO CROSSING PT | .000 mm |
| SLIDING BASE | 33.425 mm |
| RATIO OF ROLL | 3.214287 |
| CENTER ROLL POSITION | 57.978 deg |

V-H Settings—Pinon Honing Tool (45 Teeth)

| | |
|---|---|
| VERTICAL | 97.692 mm |
| HORIZONTAL | 105.181 mm |
| MACHINE CENTER TO CROSS PT | 14.265 mm |
| MACHINE ROOT ANGLE | 64.508 deg |

Once the appropriate tools are defined and produced, gears (pinions and ring gears) according to the "original design" may be honed by a process defined and carried out in accordance with the following machine basic settings and axes positions.

Ring Gear Honing Summary—Basic Settings and Axes Positions

Machine Basic Settings

| | |
|---|---|
| RADIAL DISTANCE | .0000 mm |
| TILT ANGLE | .0000 deg |
| SWIVEL ANGLE | .0000 deg |
| WORK OFFSET | −38.1000 mm |
| MACHINE ROOT ANGLE | 4.2461 deg |
| MACHINE CENTER TO CROSSING POINT | .0000 mm |
| SLIDING BASE | .0000 mm |
| RATIO OF ROLL | 1.0000 — |

Machine Axes Positions

| | |
|---|---|
| X-AXIS SETTING | 247.8627 mm |
| Y-AXIS SETTING | 38.1000 mm |
| Z-AXIS SETTING | 498.7336 mm |
| WORK AXIS POSITION - A-AXIS | .0000 deg |
| B-AXIS SETTING | 4.2461 deg |
| TOOL AXIS POSITION - C-AXIS | .0000 deg |

Pinion Honing Summary—Basic Settings and Axes Positions

Machine Basic Settings

| | |
|---|---|
| RADIAL DISTANCE | .0000 mm |
| TILT ANGLE | .0000 deg |
| SWIVEL ANGLE | .0000 deg |
| WORK OFFSET | 38.0032 mm |
| MACHINE ROOT ANGLE | −.6770 deg |
| MACHINE CENTER TO CROSSING POINT | −.2083 mm |
| SLIDING BASE | .0000 mm |
| RATIO OF ROLL | 1.0000 — |

Machine Axes Positions

| | |
|---|---|
| X-AXIS SETTING | 255.5939 mm |
| Y-AXIS SETTING | −38.0032 mm |
| Z-AXIS SETTING | 323.3426 mm |
| WORK AXIS POSITION - A-AXIS | .0000 deg |
| B-AXIS SETTING | −.6770 deg |
| TOOL AXIS POSITION - C-AXIS | .0000 deg |

From the above discussion, significant characteristics of the invention include:

- The number of pinion honing tool teeth is equal to the number of teeth of the original ring gear.
- The pinion honing machine root angle is equal to the root angle of the cutting machine for cutting the original pinion.
- The ring gear honing machine root angle is equal to the root angle of the cutting machine for cutting the ring gear honing tool.
- In the preferred embodiment, the double rotation of the basic settings as described in FIGS. 3 to 7 and 9 to 15 in connection with the triple rotation of the cutting blade profiles as described in FIGS. 8a to 8d can achieve a conjugate relationship between honing tool and work gear.
- Side honing with independent corrections of convex and concave flanks is possible.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of manufacturing a toothed bevel honing tool for honing a toothed bevel workpiece, said method comprising:

defining cutting machine setup parameters for producing said toothed bevel workpiece with a cutter wherein said cutter comprises a plurality of cutting blades with each cutting blade having a cutting blade profile, said setup parameters comprising defining a first generating gear setup comprising a generating gear setup and cutter geometry for said toothed bevel workpiece, carrying out a first transformation whereby said first generating gear setup is transformed to a second generating gear setup comprising a generating gear setup and cutter geometry for producing cutting teeth on a generating gear for said toothed bevel honing tool, carrying out a second transformation whereby said second generating gear setup is transformed to a third generating gear setup comprising a generating gear setup and cutter geometry for producing teeth on said toothed bevel honing tool whereby said toothed bevel honing tool will be conjugate to said toothed bevel workpiece, machining a bevel honing tool blank to produce a toothed bevel honing tool blank, said machining being in accordance with said third generating gear setup and cutter geometry for producing teeth on said toothed bevel honing tool, applying an abrasive coating to the teeth of said toothed bevel honing tool blank to produce said toothed bevel honing tool.

2. The method of claim 1 wherein said toothed bevel workpiece comprises a non-generated bevel ring gear defined by non-generated V-H machine settings, and wherein prior to said defining, said non-generated V-H machine settings are converted to generating basic settings which represent an internal ring gear mirror image of said non-generated bevel ring gear.

3. The method of claim 1 wherein said toothed bevel workpiece comprises a generated bevel pinion or a generated bevel ring gear.

4. The method of claim 3 wherein for said generated bevel pinion, a mating bevel ring gear and the toothed bevel honing tool in the form of a bevel ring gear comprise the same number of teeth.

5. The method of claim 1 further comprising modifying said cutting blade profile of said each cutting blade for said machining the bevel honing tool blank to produce the toothed bevel honing tool blank.

6. The method of claim 5 wherein the modified cutting blade profile comprises a zero degree Cutting edge hook angle.

7. A method of honing bevel gears comprising: providing a toothed bevel honing tool produced in accordance with claim 1, rotating a toothed bevel gear workpiece, said bevel gear workpiece having adjacent teeth with a distance between said adjacent teeth, rotating said toothed bevel gear honing tool, providing the teeth of the toothed bevel gear honing tool with a tooth thickness less than the distance between said adjacent teeth of said bevel gear workpiece, engaging the workpiece and tool in a synchronous manner, plunging said honing tool relatively into said workpiece to a full depth position whereby said honing tool does not contact opposing tooth surfaces of said adjacent teeth of the workpiece, carrying out an incremental feed rotation of at least one of the workpiece and honing tool wherein an incremental rotation is superimposed on the rotation of at least one of the workpiece and honing tool whereby honing contact occurs between the honing tool and one of the opposing tooth surfaces of the adjacent teeth.

8. The method of claim 7 wherein said incremental feed rotation is reversed whereby honing contact occurs between the honing tool and the other of the opposing tooth surfaces of the adjacent teeth.

* * * * *